United States Patent [19]
Cassens, Jr.

[11] Patent Number: 4,778,526
[45] Date of Patent: Oct. 18, 1988

[54] GUNNABLE REFRACTORY COMPOSITION

[75] Inventor: Nicholas Cassens, Jr., Pleasanton, Calif.

[73] Assignee: National Refractories & Minerals Corporation, Oakland, Calif.

[21] Appl. No.: 920,269

[22] Filed: Oct. 14, 1986

[51] Int. Cl.$^4$ .............. C04B 12/02; C04B 12/04; C04B 14/38

[52] U.S. Cl. .................... 106/77; 106/84; 106/85; 501/94; 501/127; 501/141

[58] Field of Search ............... 106/77, 84, 85; 501/94, 501/127, 133, 141

[56] References Cited

U.S. PATENT DOCUMENTS

| 3,197,317 | 7/1965 | Patchen | 106/97 |
|---|---|---|---|
| 3,203,813 | 8/1965 | Gajardo et al. | 106/84 |
| 3,256,105 | 6/1966 | Alford et al. | 106/84 |
| 3,509,066 | 4/1970 | Jacobs et al. | 252/313.1 |
| 3,793,042 | 2/1974 | Jacobs et al. | 501/118 |
| 3,879,208 | 4/1975 | Cassens, Jr. | 501/109 |
| 4,001,029 | 1/1977 | Cassens, Jr. | 501/125 |
| 4,149,897 | 4/1979 | Cassens, Jr. | 501/109 |
| 4,244,744 | 1/1981 | Cassens, Jr. | 501/118 |
| 4,276,091 | 6/1981 | Cassens, Jr. | 501/118 |
| 4,547,403 | 10/1985 | Smith | 106/85 |

FOREIGN PATENT DOCUMENTS

| 084266 | 7/1983 | European Pat. Off. | |
| 53-54213 | 5/1978 | Japan | 501/141 |
| 60-5057 | 1/1985 | Japan | 106/84 |
| 749564 | 7/1980 | U.S.S.R. | |

OTHER PUBLICATIONS

Haden and Schwint "Attapulgite, Its Properties and Applications", Industrial and Engineering Chemistry, vol. 59 (Sep. 1967) pp. 58–69.

Primary Examiner—Steven Capella
Attorney, Agent, or Firm—Malcolm McQuarrie

[57] ABSTRACT

An improved refractory composition especially adapted for use as a gunning mix is made of aggregate (for example, periclase) and a bonding material (for example, aluminum sulfate, boric acid, and citric acid) to which is added attapulgite. The composition may also contain other materials, as is known in the art.

13 Claims, No Drawings

GUNNABLE REFRACTORY COMPOSITION

BACKGROUND OF THE INVENTION

This invention concerns refractory compositions and particularly such compositions adapted to placement by gunning.

In gunning, refractory materials are placed, for example on a furnace wall, by projecting them through a gun or nozzle, the propelling force being, for example, compressed air. Water is added to the composition either before the gunning operation (as in slurry gunning, where sufficient water is added to the dry refractory composition to form a slurry, which is then projected through a nozzle into place) or during the gunning operation (as in nozzle gunning, where water is added to the dry refractory through a water ring placed just before the gun nozzle). This invention is concerned with refractory compositions which are particularly adapted for nozzle gunning.

Among the characteristics desired in a gun mix are that it move smoothly through the gun, be projected onto the furnace wall or other target without undue dusting, have low rebound, adhere well to the wall, set relatively fast (so that a reasonable thickness of refractory can be placed without falling off), and have a relatively wide range of water contents within which it exhibits the above desired characteristics. In addition, it should have the usual characteristics desired of a refractory, for example good density, good strength, and ability to withstand the high temperature environment in which it will be used.

Over the years, many different bonding systems have been suggested for gun mixes in an attempt to obtain the best balance of the desired characteristics mentioned above. For example, U.S. Pat. No. 4,001,029 discloses a refractory composition suitable for nozzle gunning which is bonded with aluminum sulfate and hydrated lime (the bond disclosed and claimed in that patent being sometimes hereafter referred to in the specification and claims as the "aluminum sulfate and lime" bond); U.S. Pat. No. 4,244,744 discloses a refractory gun mix containing (as bond) sodium silicate and gypsum (the bond disclosed and claimed in that patent being sometimes hereafter referred to in the specification and claims as the "sodium silicate and gypsum" bond); and U.S. Pat. No. 4,276,091 discloses a composition suitable for gunning with a bonding system of alkali metal phosphate and hydrated aluminum sulfate (the bond disclosed and claimed in that patent being sometimes hereafter referred to in the specification and claims as the "aluminum sulfate and phosphate" bond). As is common with gun mixes, the compositions described in the foregoing patents will often contain bentonite.

Refractory compositions have also been suggested which attempt to combine in one composition the characteristics desired in a ramming mix, a castable, and a gun mix. For example, U.S. Pat. No. 3,879,208 discloses a refractory composition suitable for forming a monolithic structure by ramming, gunning, or casting containing (as bond) aluminum sulfate and an organic acid or salt thereof, with or without the addition of a boron compound (the bond disclosed and claimed in that patent being sometimes hereafter referred to in the specification and claims as the "aluminum sulfate and organic acid" bond); and U.S. Pat. No. 4,149,897 discloses a refractory composition suitable for ramming, casting, or gunning bonded with magnesium sulfate, sodium gluconate, and a soluble boron compound (the bond disclosed and claimed in that patent being sometimes hereafter referred to in the specification and claims as the "magnesium sulfate, sodium gluconate, and soluble boron" bond).

The disclosures of the patents mentioned above are incorporated herein by reference.

Unfortunately, it is often necessary to compromise between the properties desired in a gun mix and those desired in a castable (high density, for example) or a ramming mix (explosion resistance, for example). In other words, it may not be possible to obtain the highest density and strength in a composition which has good gunning characteristics. Similarly, it is often necessary to compromise between gunning characteristics and the desired refractory properties such as high temperature strength, erosion resistance, and the like. Accordingly, the refractories manufacturer is constantly seeking the best combination of properties he can achieve in a refractory composition.

The present invention provides such an improved refractory composition suitable for nozzle gunning. More specifically, it provides a composition which combines good gunning properties such as good build-up and low rebound with good refractory properties such as high strength.

BRIEF DESCRIPTION OF THE INVENTION

It has now been found, according to this invention, that a refractory composition of superior properties and suitable for gunning by the method wherein water is admixed with the composition in a gun nozzle consists essentially of (1) from 1% to 10% by weight of bonding material and (2) from 0.1% to 5% by weight of attapulgite, the balance of the composition being (3) sized refractory aggregate, all percentages being by weight and based on the total weight of the composition.

DETAILED DESCRIPTION

The refractory aggregate used may be any such material having the requisite characteristics such as high softening point temperature, strength at high temperatures, erosion resistance, etc. The aggregate will be sized to promote good packing of the refractory particles and consequently achieve relatively high density. For example, all the aggregate will pass a half inch mesh screen (be smaller than 13 mm) and from 10% to 40% of it will pass a 100 mesh screen (be smaller than 0.15 mm). A preferred aggregate is one in which at least 10% is material passing a 100 mesh screen (smaller than 0.15 mm) and containing at least 50% MgO. An aggregate found particularly useful in the practice of this invention is periclase containing over 85% MgO.

The bond material may be any such material that is compatible with the aggregate and other materials in the composition and with the environment in which the refractory composition is to be used. It has been found that this invention is particularly useful with the aluminum sulfate and organic acid bond mentioned above. Although that bond is at its best when used for a ramming or casting product, its use in the present invention produces an excellent gun mix, as will be shown by the examples which follow. The invention is also useful with the other bonds mentioned above and it has been found that when it is used with such bonds the customarily added bentonite is not necessary to obtain a good gun mix.

Attapulgite is a material of commerce widely used in such products as paints, drilling muds, filter aids, animal litter, non-carbon copy papers, etc. It is a naturally occurring clay material found principally in the southeastern United States, although minor deposits occur in other parts of the world. It belongs to the category of clays known as fuller's earth. For a more detailed discussion of attapulgite, see the article "Attapulgite, Its Properties and Applications" by W. Linwood Haden, Jr., and Ira A. Schwint in Industrial and Engineering Chemistry, Vol. 59, September 1967, pages 58–69.

The term "attapulgite" is used in three different senses: (1) to mean the mineral itself (a hydrated magnesium aluminum silicate with a unique chain structure that leads to a needle-like morphology), sometimes called palygorskite from the location where the mineral was first found; (2) to refer to the naturally occurring material (sometimes called Attapulgus clay from the location of its principal deposits in the United States), which contains, in addition to attapulgite mineral, such impurities as montmorillonite and other clays, quartz, calcite, dolomite, etc.; and (3) to refer to the material sold in commerce, which is a beneficiated and dried or calcined form of the naturally occurring material containing up to 85 to 90% of the mineral attapulgite. In the present specification and claims, the term "attapulgite" is used in the third sense, to mean the material of commerce which is incorporated in compositions according to the present invention.

Two different types of attapulgite are recognized, colloidal (used for thickening, gelling, and stabilizing, as in paints nd drilling muds) and sorptive (used as decolorizing and clarifying agents, filter aids, floor adsorbents, animal litter, and in non-carbon copy papers, among other uses). The two different types have different properties. For example, the colloidal type has free moisture (% loss at 220° F. or 105° C.) of at least 8%, and typically from 10 to 17%, whereas the free moisture of the sorptive type is less, not over 7% and often 0%. Similarly, the BET surface area ($m^2/g$) of colloidal attapulgite is at least 150, and typically over 200, while that of sorptive attapulgite is about 130. These differences are primarily due to the different heat treatments given the two types, the sorptive type being calcined (for example, at temperatures over 200° C. or 400° F.), while the colloidal type is merely dried.

Attapulgite should be distinguished from other clays such as kaolin, in which the principal clay mineral is kaolinite, and bentonite, in which the principal clay mineral is montmorillonite. Whereas the crystal structure of these later two minerals is of a sheet type, that of attapulgite is a chain structure. This leads to particles of flake and plate shape in the case of bentonite and kaolin, respectively, while particles of attapulgite are of needle form. Also, the properties of the three clays are quite different. The surface area, sorptivity, and decolorizing power of attapulgite are high, while for bentonite these are medium and for kaolin they are low. In other words, one would not expect to use attapulgite as a substitute for either bentonite or kaolin.

There are many patents pertaining to the processing and use of attapulgite. For example, U.S. Pat. No. 3,197,317 discloses a low density oil well cement of portland cement and attapulgite, but the point of the use of attapulgite is that this material reduces the setting time of the cement less than does the use of bentonite. Also, U.S. Pat. No. 3,203,813 discloses a relatively low temperature (less than 1000° C.) thermal insulating material; while attapulgite is mentioned as one possible ingredient (as an equivalent to kaolin, among other clays), there is no example of such use. Finally, U.S. Pat. No. 3,509,066 discloses a method of deflocculating attapulgite (so as to be able to degrit it by settling) and contains a discussion of the material itself.

Those skilled in the art will appreciate that the addition of a magnesium silicate material to a predominantly MgO composition will impair the refractoriness of the composition less than would the addition of an aluminum silicate.

It will be understood that compositions according to this invention may also contain other materials, for example a carbonaceous material such a graphite or pitch, as is well known in this art.

While is is not desired to be bound by any specific theory, it is believed that the following may be the reason for the very good gunning properties of compositions according to this invention. As mentioned above, it is necessary that the bond in a gun mix set up relatively rapidly so that the gunned material will adhere to the furnace wall or other surface on which it is placed. It is also desirable that the bond have a relatively high strength at operating temperatures. In the past, it has been necessary to rely on a single bond system to provide both these properties. In the present invention, it is believed, the attapulgite provides the initial adherence to the wall or other surface and the bond component can be chosen to provide other properties, e.g., strength at high temperatures. In other words, it is not necessary, in compositions according to the present invention, that the bond provide the initial adherence and set of the gunned material, that function being carried out by the attapulgite.

Compositions according to this invention can be used wherever gun mixes are used, for example to repair holes in furnaces such as BOF furnaces, to repair slag line cutting in electric furnaces, and such similar uses, as are well known in this art. Usually, compositions according to this invention will be made by a refractories manufacturer, the dry ingredients being mixed together (for example, in a rotating drum mixer with internal paddles or in a Muller mixer without wheels), and placed in bags or other containers for shipment to a customer, who will apply the material, mixing water with it, for example in a nozzle gun as described above.

EXAMPLES

Table I gives the compositions of several mixes made to demonstrate the effectiveness of this invention. Some of the compositions (B, C, D, E, F, G, H, J, K, M, P, R, and T) are within the scope of the invention and some (A, L, N, Q, and S) are comparison compositions. The amounts of the different ingredients shown in Table I are in parts by weight and the properties in the units indicated.

The aggregate used was a synthetic periclase made by reacting seawater with calcined dolomite, as is well known. It had the following typical chemical composition: 2.1% $SiO_2$, 0.9% CaO, 0.4% Fe, 0.2% 0.2% $B_2O_3$, and (by difference) 96.2% MgO; the $Cr_2O_3$ content was less than 0.01%.

TABLE I

| Composition | A | B | C | D | E | F | G | H | J | K | L | M | N | P | Q | R | S | T |
|---|---|---|---|---|---|---|---|---|---|---|---|---|---|---|---|---|---|---|
| Aggregate | | | | | | | | | | | | | | | | | | |
| Total | 98 | 96 | 96 | 96 | 96 | 96 | 96 | 96 | 96 | 95 | 98 | 96 | 95 | 95 | 95 | 95 | 95 | 95 |
| Amount - 100 mesh | 31 | 29 | 29 | 26 | 21 | 21 | 20 | 21 | 21 | 21 | 30 | 22 | 20 | 20 | 20 | 20 | 20 | 20 |
| Bond | | | | | | | | | | | | | | | | | | |
| Aluminum Sulfate (Hydrated) | 0.8 | 0.8 | 0.8 | 0.8 | 0.8 | 0.8 | 0.8 | 0.8 | 0.8 | 0.8 | — | — | — | — | 1.3 | 1.3 | 2.2 | 2.2 |
| Boric Acid | 0.7 | 0.7 | 0.7 | 0.7 | 0.7 | 0.7 | 0.7 | 0.7 | 0.7 | — | 0.7 | 0.7 | — | — | — | — | — | — |
| Citric Acid (Food Grade) | 0.7 | 0.7 | 0.7 | 0.7 | 0.7 | 0.7 | 0.7 | 0.7 | 0.7 | 0.7 | — | — | — | — | — | — | — | — |
| Gypsum (Dihydrate) | — | — | — | — | — | — | — | — | — | — | — | — | 1.1 | 1.1 | — | — | — | — |
| Lime (Hydrated) | — | — | — | — | — | — | — | — | — | — | — | — | — | — | — | — | 0.8 | 0.8 |
| Magnesium Sulfate (Calcined) | — | — | — | — | — | — | — | — | — | — | 0.8 | 0.8 | — | — | — | — | — | — |
| Sodium Gluconate | — | — | — | — | — | — | — | — | — | — | 0.6 | 0.6 | — | — | — | — | — | — |
| Sodium Silicate (Na:Si ratio 1:2) | — | — | — | — | — | — | — | — | — | — | — | — | 1.9 | 1.9 | — | — | — | — |
| Sodium Tripolyphosphate | — | — | — | — | — | — | — | — | — | — | — | — | — | — | 1.7 | 1.7 | — | — |
| Attapulgite | | | | | | | | | | | | | | | | | | |
| Min-U-Gel FG | — | 2.0 | — | — | 2.0 | — | — | 1.0 | 1.0 | — | — | 2.0 | — | 2.0 | — | 2.0 | — | 2.0 |
| Min-U-Gel 400 | — | — | — | — | — | 2.0 | 2.0 | — | — | 2.0 | — | — | — | — | — | — | — | — |
| Min-U-Gel 500 | — | — | 2.0 | 2.0 | — | — | — | — | — | — | — | — | — | — | — | — | — | — |
| Other Materials | | | | | | | | | | | | | | | | | | |
| Bentonite (Volclay 200) | — | — | — | — | — | — | — | — | — | — | — | — | 2.0 | — | 2.0 | — | 2.0 | — |
| Flour (White Enriched Food Grade) | — | — | — | — | — | — | — | — | 1.0 | — | — | — | — | — | — | — | — | — |
| Frit | — | — | — | — | — | — | — | — | — | 1.0 | — | — | — | — | — | — | — | — |
| Methocel F4M | — | — | — | — | — | — | — | 0.5 | — | — | — | — | — | — | — | — | — | — |
| Properties | | | | | | | | | | | | | | | | | | |
| Build-up (inches) | 3–4 | 4–5 | 6 | 4–5 | 4–5 | 4–5 | 4–5 | 4–5 | 4–5 | 5 | 3 | 4 | 4.5 | 5.5 | 5 | 4 | 5 | 4.5 |
| Density (lb/ft$^3$) | 144 | 150 | 149 | 146 | 145 | 147 | 146 | 142 | 145 | 146 | 159 | 151 | 144 | 138 | 150 | 145 | 147 | 141 |
| Rebound (%) | 43 | 24 | 19 | 22 | 21 | 16 | 18 | 26 | 22 | 16 | 49 | 21 | 18 | 11 | 21 | 19 | 24 | 14 |

It was sized so that substantially all passed a 4 mesh screen (was smaller than 4.7 mm); the compositions contained the amount of −100 mesh (smaller than 0.15 mm) aggregate indicated in Table I.

The bond components are standard articles of commerce and all passed a 10 mesh screen (were smaller than 1.6 mm). Further details of these materials are included in the disclosures of the patents cited in the "Background of the Invention."

"Min-U-Gel" is a trademark of the Floridin Company, Berkeley Springs, W. Va., and the terms FG, 400, and 500 are grade designations of different attapulgites they supply. Each is of the gelling type and contains about 11% free moisture. They different mainly in their fineness, the 400 and 500 grades being finer (and also somewhat more expensive).

The other ingredients used are also standard articles of commerce. The Lo-Sil frit (manufactured by the Ferro Corporation) is a low silica frit containing lime, alumina, and boron oxide. It was added as an insoluble form of boron addition to enhance sintering.

The ingredients of each composition were mixed for 5 minutes in a V-Blender.

Each of the compositions was gunned through a "detuned" nozzle mix gun, that is to say, a gun which had been designed for less than optimum performance. For example, the air line was connected directly to the air-/material mixing chamber, rather than just below the material butterfly valve, where it helps to prevent bridging and other feeding problems. Also, the material was fed to the nozzle through a short (25 feet or about 8 meters), old, very stiff 1.5 inch (38 mm) ID hose, which acentuated any tendency of the mix toward surging, and the water ring was attached using a 1.25 inch (3.2 cm) pipe nipple, thus providing an internal restriction which could cause flow problems. In other words, the equipment was designed to simulate the below average type of gunning equipment sometimes found in actual use in the field and not the optimally designed and maintained equipment which might be used in a research laboratory.

Compositions A to G demonstrate the effect of various attapulgite additions to a refractory bonded with a "universal" bond, that is to say, a bond that can be used in a ramming, casting, or gunning mix. As can be seem by comparing Composition A with Compositions B through G, the compositions with attapulgite show better build-up during cold gunning onto a substantially vertical surface, have generally better density, and show very greatly reduced rebound. Compositions substantially the same as A, B, and C were hot gunned onto a furnace wall at 1300° C.; comparison Composition A showed a great deal of dusting (impairing visibility for the gun operator) and the small amount of material built up on the wall fell off before completion of gunning. In contrast, the two compositions according to this invention showed vastly improved visibility and very good build-up.

Compositions H, J, and K demonstrate the use of other materials in compositions according to this invention. Again, they show the increased build-up and vastly reduced rebound of the previously discussed compositions, and their densities were comparable.

The remaining compositions demonstrate the benefits of this invention with other bonds, the pairs of compositions (L,M), (N,P), (Q,R), and (S,T) showing the effect of attapulgite additions on four different bond systems. The bond of Compositions L and M is another "universal" bond, the remaining three being bonds especially adapted for use in gun mixes. It can be seen that the attapulgite addition of this invention is beneficial even in the case of state-of-the-art gun mixes, and that when attapulgite is used, it is not necessary to use bentonite in the mix. Again, Compositions L through T were also hot gunned; those compositions containing attapulgite again showed excellent visibility and build-up, even better in many cases than that of the prior art gun mixes.

In summary, while the present invention makes a composition with a "universal" bond into an excellent gun mix, it also enhances the properties of compositions designed as gun mixes.

The superior results with compositions according to this invention are all the more surprising when it is considered that, when subjected to a gelling test that has been used in the refractories industry for over 30 years, the attapulgite used herein was indicated to be vastly inferior in gelling properties to bentonite, for example. The gelling test referred to consists of adding about 7 grams of the material to be tested to 100 ml of water in a test tube, shaking the mixture, letting it stand for up to 24 hours, and then inverting the test tube. A good gelling agent (for example, bentonite) will show no flow when inverted after standing for as little as 6 hours and certainly after 24 hours. However, in this test attapulgite (Min-U-Gel FG) flowed when inverted even after standing for 48 hours.

In the specification and claims, percentages and parts are by weight unless otherwise indicated. Mesh sizes referred to herein are Tyler standard screen sizes which are defined in Chemical Engineers' Handbook, John H. Perry, Editor-in-Chief, Third Edition, 1950, published by McGraw Hill Company, at page 963. For example, a 100 mesh screen opening corresponds to 147 microns or 0.147 mm. Analyses of mineral components are reported in the usual manner, expressed as simple oxides, e.g., MgO and $SiO_2$, although the components may actually be present in various combinations, e.g., as a magnesium silicate.

I claim:

1. A refractory composition suitable for gunning by the method wherein water is admixed with the composition in a gun nozzle, said composition consisting essentially of (1) from 1% to 10% by weight of bonding material and (2) from 0.1% to 5% by weight of attapulgite, the balance of the composition being (3) sized refractory aggregate, all percentages being by weight and based on the total weight of the composition.

2. Composition according to claim 1 wherein the attapulgite is a gelling attapulgite.

3. Composition according to claim 2 wherein the attapulgite has a BET surface area of at least 150 $m^2/g$ and at least 8% by weight free moisture.

4. Composition according to claim 1 wherein the bonding material is one of (a) aluminum sulfate and lime, (b) magnesium sulfate, sodium gluconate, and soluble boron, (c) sodium silicate and gypsum, or (d) aluminum sulfate and phosphate.

5. Composition according to claim 1 wherein the refractory aggregate includes at least 10% material passing a 100 mesh screen and containing at least 50% MgO.

6. Composition according to claim 5 wherein the bonding material is aluminum sulfate and organic acid.

7. A refractory composition suitable for gunning by the method wherein water is admixed with the composition in a gun nozzle, and particularly adapted for gunning onto hot surfaces, said composition consisting essentially of (1) from 1% to 10% by weight of bonding material and (2) from 0.1% to 5% by weight of gelling attapulgite having a BET surface area of at least 150 $m^2/g$ and at least 8% free moisture, the balance of the composition being (3) sized refractory aggregate, all percentages being by weight and based on the total weight of the composition.

8. Composition according to claim 7 wherein the bonding material is one of (a) aluminum sulfate and lime, (b) magnesium sulfate, sodium gluconate, and soluble boron, (c) sodium silicate and gypsum, or (d) aluminum sulfate and phosphate.

9. Composition according to claim 7 wherein the refractory aggregate includes at least 10% material passing a 100 mesh screen and containing at least 50% MgO.

10. Composition according to claim 9 wherein the bonding material is aluminum sulfate and organic acid.

11. Composition according to claim 7 wherein the aggregate is periclase containing at least 85% MgO.

12. Composition according to claim 11 wherein the bonding material is one of (a) aluminum sulfate and lime, (b) magnesium sulfate, sodium gluconate, and soluble boron, (c) sodium silicate and gypsum, (d) aluminum sulfate and phosphate, or (e) aluminum sulfate and organic acid.

13. Composition according to claim 12 wherein the bonding material is aluminum sulfate and organic acid.

* * * * *